Figure 1:
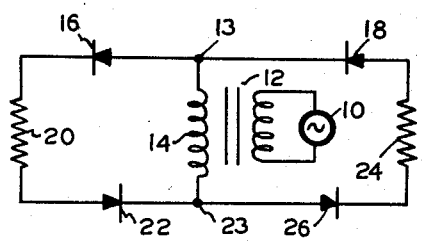

Aug. 18, 1964   L. LEVY   3,145,305
D.C. POWER SUPPLY FOR ISOLATED LOADS
Filed Sept. 18, 1961

INVENTOR.
LESTER LEVY
BY
Edward Goldberg
ATTORNEY

United States Patent Office 3,145,305
Patented Aug. 18, 1964

3,145,305
D.C. POWER SUPPLY FOR ISOLATED LOADS
Lester Levy, 535 Parkside Ave., Brooklyn, N.Y.
Filed Sept. 18, 1961, Ser. No. 138,923
8 Claims. (Cl. 307—41)

This invention relates to direct current power supplies and particularly to a device which is capable of supplying direct current and voltage to a plurality of loads from a common alternating current source, while providing isolation between loads.

In many applications where direct current is supplied to a plurality of loads or circuits, it is desirable to provide isolation between the various elements to prevent short circuits, distortion, reduced output and otherwise impairing operation. In addition, it is useful to have a choice of one or more grounds or reference points which are not restricted by the circuit configuration to a specific position. Generally in order to prevent interaction and provide flexibility, it has been necessary to utilize separate sources of alternating current, such as different generators or separate isolated windings on a common transformer. These solutions have been unsatisfactory in many applications, due to the complexity and cost of the assembled components and circuits.

It is therefore the primary object of the present invention to provide simplified, flexible direct current power supplies utilizing a common alternating current source which permits parallel drive of a plurality of substantially isolated loads and makes available a choice of ground connections.

The instant device utilizes a common transformer secondary winding, or a generator, to alternately supply power to a plurality of parallel loads. The loads are isolated from each other and from ground by a pair of diodes arranged on each side of each load to conduct in series therewith on alternate portions of a cycle. Taps may also be provided on the common winding to permit use of smaller voltages and added numbers of loads. In addition a capacitor may be connected in parallel with each load to improve isolation by limiting the period of conduction while also providing filtering.

One form of the device is particularly applicable to a push-pull type output amplifier such as described in Patent No. 2,980,840, issued April 18, 1961, to the instant inventor, wherein substantially isolated power supplies provide current through each half of a push-pull circuit, which includes a common impedance. In another form, the invention may be applied to battery operated telephone lines which have separate batteries for each isolated line. Each battery may thus be charged while maintaining isolation of the lines. Cascade amplifiers may also utilize such power supplies to minimize interstage common impedance coupling effects.

Figure 2:
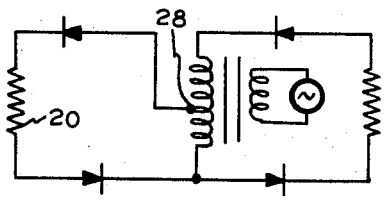
Figure 3:
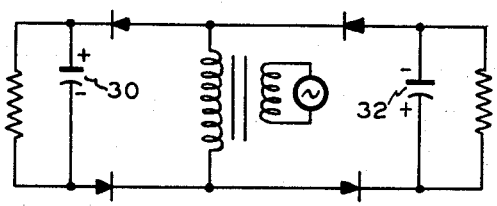
Figure 4:
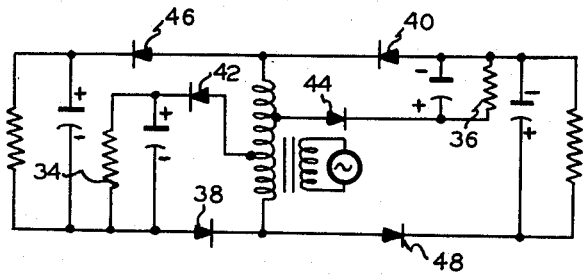
Figure 5:
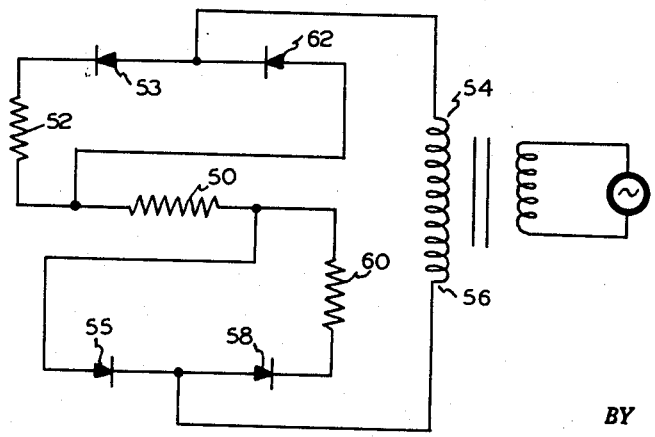

The invention will be more fully understood and other forms, objects and advantages will become apparent in the following description and accompanying drawings, in which;

FIG. 1 shows a circuit embodying the present invention which supplies two isolated loads, FIG. 2 shows a variation of the circuit of the invention utilizing a tapped winding, FIG. 3 shows another variation utilizing capacitors to provide improved isolation and filtering, FIG. 4 shows the use of the circuit to supply and isolate a plurality of loads, and FIG. 5 shows the application of the invention to push-pull type load circuits sharing a common impedance.

As shown in FIG. 1, an alternating current source 10 is connected to a primary winding of a transformer 12. One end 13 of a common secondary winding 14 is connected in parallel to two oppositely poled diode rectifiers 16 and 18. These diodes are preferably of the semiconductor type to permit circuit simplification, but other types such as vacuum tubes may be employed where higher reverse impedances and more complete isolation are required. In addition, gaseous rectifiers, thyratrons and solid state controlled rectifiers may be used. Diode 16 is connected in series to a first load 20, while a second series diode 22 connects the other side of load 20 to the opposite polarity terminal 23 of the common transformer winding 14.

Diode 16 is connected with the cathode to the first load 20 and the anode to terminal 13 of the source, while diode 22 has the anode connected to the other side of the load and the cathode to the other terminal 23 of the source. Diodes 16 and 22 are thus connected in a series aiding relation to provide a complete path for current conduction between opposite ends of the transformer during one half cycle, and prevent conduction in the reverse direction during the next period.

Diode 18 is also connected in series between the common transformer terminal 13 and one side of a second load 24, with the other side of load 24 being connected to the other end 23 of winding 14 through a second series diode 26, to thereby form a second parallel load circuit path. Diodes 18 and 26 however are poled to conduct in the opposite direction from that of diodes 16 and 22, during the alternate interval of operation. Thus the anode of diode 26 connects to terminal 23 of winding 14 and to the cathode of diode 22, and the cathode of diode 26 connects to load 24. The anode of diode 18 is connected to the other side of load 24, and the cathode connects to the other winding terminal 13 and to the anode of diode 16, to complete the circuit.

Therefore, each of the parallel load circuits will conduct alternately on opposite half cycles of the generator or source and will alternately prevent conduction during the interim periods. Due to the series arrangement of diodes on each side of each load, there is virtually complete isolation between the two parallel load circuits. Thus when current of one polarity flows from terminal 13 of winding 14 through diode 16, load 20 and diode 22 in series, to the oppositely poled end 23 of winding 14, diodes 18 and 26 at the same time prevent current flow through load 24.

During the alternate cycle, the transformer polarity reverses and current will flow from the lower terminal 23 of winding 14, through diode 26, load 24 and diode 18, in series, and return to the opposite polarity terminal 13 of the common secondary winding 14. At this time, diodes 22 and 16 act as high reverse impedances to prevent conduction from the transformer through load 20 in the undesired direction. Thus half-wave rectified direct current flows alternately through each load in opposite directions. Since each side of each load is isolated from each other, either side of the common winding or one side of each load or an intermediate point on each load may be utilized as a reference which is independent of any external grounds. As a result, a choice may be made to operate the loads with any desired polarity. This arrangement thus differs from conventional circuits which have diodes on only one side of the loads and have the other side connected to one common reference point or ground.

As shown in FIG. 2, smaller voltages may be supplied to one parallel load 20, by utilizing a tap connection 28 on the common secondary winding. This configuration eliminates the need for an added winding as usually employed, or the common practice of using a series dropping resistor or voltage divider arrangement across the full winding, which would cause inefficiency and poor voltage regulation.

By placing capacitors 30 and 32 in parallel with each respective load, as shown in FIG. 3, improved isolation and filtering are obtained. Due to the rectifier action, the capacitors charge and discharge alternately during each cycle and develop and maintain an effective average charge or back voltage, with the polarities as indicated. The back voltage acts as a reverse bias, which permits the rectifiers in each parallel load circuit to conduct only during the portion of the half cycle in which the transformer voltage exceeds the capacitor voltage. This reduces the conduction period to a substantially shorter interval than a half cycle and thus improves the isolation between loads, since there will be times when neither load is receiving current from the transformer. In actual operation, the capacitors charge rapidly through the diodes and discharge slowly through the loads, with the capacitor voltage pulsating between predetermined levels with respect to an independent reference. Conduction thus occurs during the time that the instantaneous value of the applied transformer voltage exceeds the instantaneous value of the capacitor back voltage. The ratings of the capacitors should be such as to accommodate the desired range of voltages and currents.

The use of capacitors in parallel with a plurality of loads, to limit conduction to periods smaller than a half cycle, may similarly be applied to polyphase systems and loads. Thus, any two terminals of a three phase alternating current supply may be used in separate pairs to act as a common source alternately supplying two or more parallel loads.

As shown in FIG. 4 by utilizing additional tapped connections in conjunction with the full transformer secondary winding, a plurality of loads may be supplied with various larger and smaller direct voltages. In the arrangement illustrated, four loads are separated into pairs on each side of the common winding. The tapped loads 34 and 36 in each parallel circuit are provided with a connection common to one side of each load positioned across the full winding. Thus a common diode located in the return conduction path of both loads in each parallel circuit, as shown by diodes 38 and 40 can provide the required function for two loads. The unique arrangement requires only one additional diode in series with each tapped load. Diodes 42 and 44 respectively, together with the originally positioned diodes 46 and 48 in series with the full windings and loads, complete the arrangement. Six diodes can therefore be utilized to provide isolation between four loads having different voltages. This type of configuration may be employed in an interstage amplifier circuit such as described in previously mentioned Patent No. 2,980,840 of the present inventor, wherein screen and plate power supplies have a common connection to a cathode, and two pairs of such power supplies are utilized in a push-pull type circuit.

The arrangement of FIG. 5 schematically shows the present circuit as incorporated in another push-pull type output stage configuration utilized in the above discussed patent. Load 50 represents a common impedance, such as the autotransformer illustrated therein, connected in series with load 52, which may be the first plate-cathode circuit of a push-pull amplifier stage, and diode 53 to one end 54 of the common transformer winding. Diode 55 connects the other transformer end 56 to the other side of load 50 to form a complete conducting path during one half cycle. During the alternate half cycle, reverse conduction occurs from transformer terminal 56 through diode 58 and load 60, which may be the second plate-cathode circuit of the push-pull amplifier, through load 50 and diode 62, to the first end 54 of the transformer. Load 50 thus alternately forms part of each parallel circuit. Use of the four diodes in the instant arrangement effectively isolates loads 52 and 60 from each other during alternate non-conduction periods, while permitting the parallel circuits to partially share the common load in which current is periodically reversed.

It may thus be seen that the present invention provides a novel power supply configuration which can supply a plurality of loads from a common transformer winding, while substantially isolating each load. While several embodiments have been illustrated, it is apparent that the invention is not limited to the exact forms or uses shown and that many other variations may be made in the particular design and arrangement without departing from the scope of the invention as set forth in the appended claims.

What is claimed is:

1. A direct current power supply comprising a common alternating current source, first and second load means arranged in parallel with said source, a first pair of current rectifier means arranged one on each side of said first load to connect said source thereto, said first pair of rectifier means forming a series conduction path with said first load means permitting current flow during one alternate period of said source in one direction through said first load and preventing current flow in the opposite direction during the other alternate period, a second pair of current rectifier means arranged one on each side of said second load means to connect said source thereto, said second pair of rectifier means forming a series conduction path with said second load permitting reverse polarity current flow during said other alternate period of said source in one direction through said second load and preventing current flow in the opposite direction during said one alternate period, two of said rectifier means being connected together at each terminal of said source whereby said first and second parallel load means are substantially isolated from each other.

2. The device of claim 1 wherein said common alternating current source comprises one common transformer secondary winding.

3. The device of claim 1 including capacitive means connected in parallel with each said load, said capacitive means developing an average reverse voltage limiting conduction to said loads to periods wherein said alternating source exceeds said average voltage.

4. The device of claim 1 wherein said first and second load means include a common load means connected therebetween, and said conduction path during said one alternate period includes said first load and common load in series, and said conduction path during said other alternate period includes said second load and common load in series, and wherein current through said common load means flows in opposite directions during each said alternate period.

5. The device of claim 2 wherein said transformer winding comprises tap connection means permitting selection of the voltage supplied to a load.

6. The device of claim 3 including tap means on said winding permitting connection of a plurality of loads and selection of the voltage supplied to said loads.

7. The device of claim 5 wherein said tap means permit connection of a plurality of rectifier means and loads to said transformer winding.

8. The device of claim 6 including a first tap means connected to a third load means, a fifth current rectifier means connected between said first tap means and one said of said third load means permitting conduction in the same direction as said first pair of rectifier means, one of said first pair being connected from the other side of said third load to complete a path to said source for both said first and third load means, a second tap means connected to a fourth load means, a sixth current rectifier means connected between said second tap means and one side of said fourth load means to permit conduction in the same direction as said second pair of rectifier means, one of said second pair being connected from the other side of said fourth load to complete a path to said source for both said second and fourth load means.

References Cited in the file of this patent

UNITED STATES PATENTS

| | | |
|---|---|---|
| 2,465,451 | Hedstrom | Mar. 29, 1949 |
| 3,094,612 | Sterzer | June 18, 1963 |